United States Patent
Bennett, III et al.

(10) Patent No.: US 6,603,853 B1
(45) Date of Patent: Aug. 5, 2003

(54) METHOD AND APPARATUS FOR DEMONSTRATING TELECOMMUNICATIONS PRODUCTS

(75) Inventors: Raymond Walden Bennett, III, Naperville, IL (US); Robert Wesley Bossemeyer, Jr., St. Charles, IL (US); Michael Steven Pickard, Highland Park, IL (US); Jordan Howard Light, Chicago, IL (US); Barry James Sullivan, Long Grove, IL (US); Edmond W. Israelski, Lake Barrington, IL (US); Denise Violetta Kagan, Riverwoods, IL (US); Richard Peter Krupka, Barrington, IL (US); Jose M. Cruz, Naperville, IL (US); Philip Martin Stebbings, Aurora, IL (US); Bruce Edward Stuckman, Algonquin, IL (US)

(73) Assignee: Ameritech Corporation, Hoffman Estates, IL (US)

( * ) Notice: Subject to any disclaimer, the term of this patent is extended or adjusted under 35 U.S.C. 154(b) by 0 days.

(21) Appl. No.: 09/384,704

(22) Filed: Aug. 27, 1999

(51) Int. Cl.[7] .................................................. H04M 3/00
(52) U.S. Cl. ........................... 379/265.01; 379/265.09
(58) Field of Search ................. 379/265.01, 266.09, 379/309, 265.02, 265.09; 376/265.02, 265.03, 265.04, 265.05, 265.06, 265.07, 265.08, 265.1, 265.11, 265.12, 265.13, 265.14, 266.01, 266.02, 266.03, 266.04, 266.05, 266.06, 266.07, 266.08, 266.1, 93.01

(56) References Cited

U.S. PATENT DOCUMENTS

| | | | |
|---|---|---|---|
| 4,348,554 A | | 9/1982 | Asmuth |
| 5,065,422 A | * | 11/1991 | Ishikawa ..................... 379/11 |
| 5,193,110 A | | 3/1993 | Jones |
| 5,490,212 A | | 2/1996 | Lautenschlager |
| 5,497,373 A | | 3/1996 | Hulen |
| 5,570,413 A | | 10/1996 | Ahlberg |
| 5,689,641 A | | 11/1997 | Ludwig |
| 5,701,419 A | * | 12/1997 | McConnell ................. 372/211 |
| 5,889,954 A | | 3/1999 | Gessel |
| 5,909,545 A | * | 6/1999 | Frese, II et al. ........ 395/200.38 |
| 5,933,475 A | * | 8/1999 | Coleman ........................ 379/1 |
| 6,046,762 A | * | 4/2000 | Sonesh et al. ........... 379/93.21 |
| 6,055,298 A | * | 4/2000 | Sugimoto ...................... 379/9 |
| 6,151,643 A | * | 11/2000 | Cheng et al. ................. 710/36 |
| 6,314,408 B1 | * | 11/2001 | Salas et al. ................... 705/54 |

* cited by examiner

Primary Examiner—William J. Deane, Jr.

(57) ABSTRACT

A telecommunication product demonstration system is comprised of three major components, including customer facility equipment, sales agent facility equipment, and telecommunication service simulation equipment. The system allows a sales agent to demonstrate various long distance services and telecommunications services to potential customers.

12 Claims, 1 Drawing Sheet

METHOD AND APPARATUS FOR DEMONSTRATING TELECOMMUNICATIONS PRODUCTS

TECHNICAL FIELD

The present invention relates generally to telecommunication systems and more particularly to a method and apparatus for demonstrating telecommunications products.

BACKGROUND ART

The telephone is one of the most widely used pieces of communication equipment in the world. At first, it was merely a convenient tool to allow people to communicate with each other without the necessity of being face-to-face and without the time log associated with written communication. Presently, in addition to performing communications functions, the telephone is a tool used to market products and services, provide technical support for consumer products, and, among other things, allow callers to access information such as their own financial data. Thus, the telephone is a major business, marketing and information resource.

When marketing telecommunication products and services, sales representatives discuss available services and attempt to align them with potential customer needs. Presently, the agent must use verbal descriptions to convey the benefits of the service to the potential customer. The agent can claim various benefits and attributes of the offered service such as superior sound quality or ease of use, but these sales propositions cannot be directly demonstrated. In other words, the problem is analogous to selling an automobile without allowing the potential buyer to test drive the vehicle.

The desire, therefore, is to provide an improved method and apparatus for demonstrating telecommunications products to potential customers. Preferably, the improved method provides a means for sales agents to provide potential customers with direct experience with the service.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
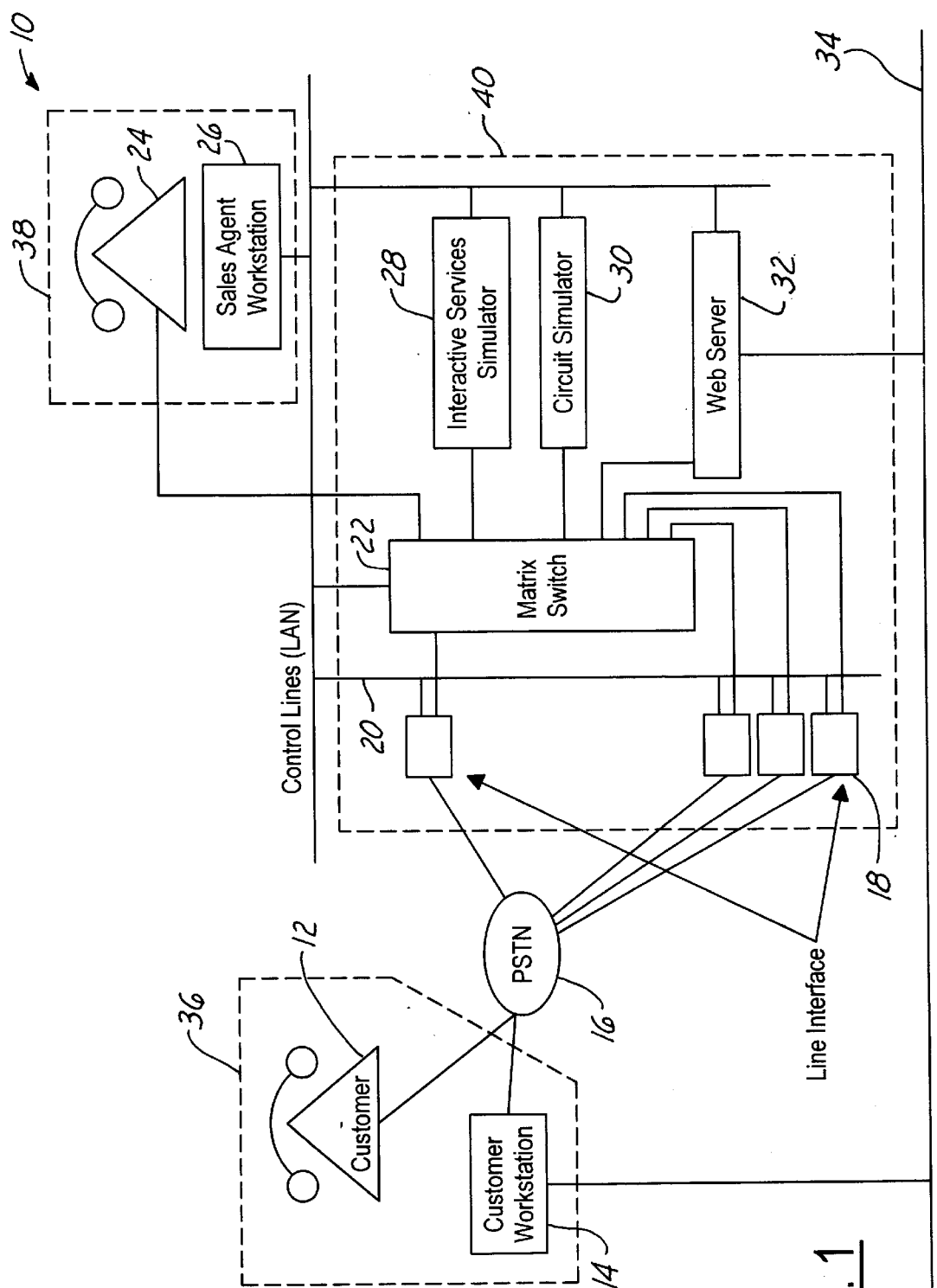
FIG. 1 is a block diagram of a telecommunication product demonstration system in accordance with one embodiment of the present invention.

Referring to FIG. 1, a block diagram of a telecommunication product demonstration system 10 in accordance with one embodiment of the present invention is illustrated. Telecommunication product demonstration system 10 comprises three major components, including customer facility equipment 36, sales agent facility equipment 38, and telecommunication service simulation equipment 40.

Customer facility equipment 36 is located on a potential customer's premise and is coupled to public switched telecommunications network (PSTN) 16. Customer facility equipment 36 comprises a customer telephone 12 coupled to PSTN 16 for providing telephone service to the customer and a customer workstation 14 such as a computer. In the preferred embodiment, customer workstation 14 has an Internet connection 34 and is coupled to PSTN 16.

Sales agent facility equipment 38 is located on the sales agent's premise and is coupled to telecommunication service simulation equipment 40. Sales agent facility equipment 38 comprises a sales agent telephone 24 for providing telephone service to the sales agent and a sales agent workstation 26. Sales agent workstation 26 is coupled to control line 20 and provides overall control of telecommunication service simulation equipment 40 for demonstration purposes.

Telecommunication service simulation equipment 40 is coupled to sales agent facility equipment 38 and PSTN 16. Telecommunication service simulation equipment 40 comprises a plurality of line interface modules 18, matrix switch 22, interactive services simulator 28, circuit simulator 30 and web server 32.

Line interface modules 18 are coupled to PSTN 16 and are controlled from sales agent workstation 26 or web server 32 via control lines 20. Line interface modules 18 are capable of sending signals to create a connection through PSTN 16. Line interface modules 18 could connect to an ordinary analog telephone line or they could be used with ISDN or similar digital networks.

Matrix switch 22 is coupled to line interface modules 18, sales agent telephone 24, interactive services simulator 28, circuit simulator 30 and web server 32. Matrix switch 22 is controlled from sales agent workstation 26 or web server 32 via control line 20 and allows the sales agent to speak to the potential customer through matrix switch 22 and a line interface module 18. Matrix switch 22 is a switch capable of connecting any number of lines on one side to any combination of lines on the other side. Typically, matrix switch 22 also provides automatic gain control and noise limiting in the same manner as a conference bridge.

Interactive services simulator 28 is coupled to matrix switch 22 and is controlled from sales agent workstation 26 or web server 32 via control line 20 and allows the sales agent to demonstrated various telecommunication services to a potential customer. Alternatively, system 10 could be configured to automatically demonstrate various telecommunication services to a potential customer when the potential customer calls some particular telephone number. Interactive services simulator 28 is capable of demonstrating a plurality of telecommunication services, including, voice mail, privacy manager, and talking call waiting.

Circuit simulator 30 is coupled to matrix switch 22 and is controlled from sales agent workstation 26 or web server 32 via control line 20 and allows the sales agent to demonstrate various long distance services to a potential customer. Circuit simulator 30 is capable of simulating a plurality of long distance services, including, conventional circuit switched services provided by various long distance companies, and packet switched services using varying degrees of compression provided over the Internet or other private Internet Protocol (IP) links.

Web server 32 is coupled to matrix switch 22 and Internet connection 34 and allows remote control of line interface modules 18, matrix switch 22, interactive services simulator 28, and circuit simulator 30 via control line 20. Potential customers can access web server 32 via an Internet connection 34 and can interact with various services using customer workstation 14. In addition, a sales agent could be bridged onto the call at any time.

In operation, a sales agent controls matrix switch 22 and line interface modules 18 via control line 20 to establish a connection (call) between sales agent telephone 24 and customer telephone 12 via PSTN 16. The sales agent then discusses various telecommunications services such as, for example, long distance service with the potential customer. During their discussion the sales agent can control matrix switch 22 and circuit simulator 30 to demonstrate the simulated quality or features of different distance services. Alternatively, the sales agent can control matrix switch 22 and line interface modules 18 to demonstrate the quality or features of the actual distance services via PSTN 16.

The sales agent then discusses various other telecommunication services with the potential customer. The sales agent controls matrix switch 22 and interactive services simulator 28 to demonstrate each service. In the case of voice mail, interactive services simulator 28 allows the sales agent to invoke voice mail and to control it so that, for example, normal operation could be "paused" so the potential customer can be told about its capabilities at appropriate times. In the case of a service such as privacy manager, interactive services simulator 28 allows the sales agent to assist the potential customer to step through the service being demonstrated. In this manner, the customer has the chance to "test drive" each potential telecommunication service of interest.

In another aspect of the invention, interactive services simulator 28 may be used for automated demonstration of services. The potential customer could call telecommunication service simulation equipment 40 and/or connects to it via Internet connection 34. The interactive services simulator 28 then provides interactive voice response menus to guide the potential customer through the various services that can be demonstrated. In addition, web server 32 could provide demonstration of in-bound and out-bound services or synchronize with a telephone connection to provide feedback during service demonstration. Customer activity is tracked on sales agent workstation 26 for potential follow-up.

From the foregoing, it can be seen that there has been brought to the art a new and improved method and apparatus for demonstrating telecommunications products. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. An apparatus for demonstrating telecommunications products, comprising:

customer telephone located on a customer premise coupled to a public switched telecommunications network;

a plurality of telecommunication service equipment coupled to said public switched telecommunications network whereby said telecommunication service equipment is in communication with said customer phone and provides at least one demonstrable service;

a sales agent telephone located on a sales agent premise coupled to said telecommunication service equipment whereby said sales agent telephone is in communication with said customer telephone; and a sales agent workstation located on a sales agent premise coupled to and controlling said telecommunication service equipment to selectively demonstrate said at least one demonstrable service to a customer while said sales agent telephone is in communication with said customer telephone.

2. An apparatus for demonstrating telecommunications products as recited in claim 1 further comprising a customer workstation coupled to said public switched telecommunications network and an Internet connection.

3. An apparatus for demonstrating telecommunications products as recited in claim 1 wherein said telecommunication service equipment is coupled to the Internet.

4. An apparatus for demonstrating telecommunications products as recited in claim 1 wherein said telecommunication service equipment includes a web server coupled to an Internet connection said web server controlling said telecommunication service equipment.

5. An apparatus for demonstrating telecommunications products as recited in claim 1 wherein said telecommunication service equipment includes a plurality of line interface modules, said modules being coupled to said public switched telecommunications network and controlled by said sales agent workstation.

6. An apparatus for demonstrating telecommunications products as recited in claim 5 wherein said modules are coupled to said public switched telecommunications network and controlled by a web server.

7. An apparatus for demonstrating telecommunications products as recited in claim 1 wherein said telecommunication service equipment includes a matrix switch, coupled to a plurality of line interface modules said matrix switch being controlled by said sales agent workstation.

8. An apparatus for demonstrating telecommunications products as recited in claim 7 wherein said matrix switch is coupled to a plurality of line interface modules and controlled by a web server.

9. An apparatus for demonstrating telecommunications products as recited in claim 1 wherein said telecommunication service equipment includes an interactive services simulator, coupled to a matrix switch said interactive services simulator being controlled by said sales agent workstation.

10. An apparatus for demonstrating telecommunications products as recited in claim 9 wherein said interactive services simulator is coupled to a matrix switch and controlled by a web server.

11. An apparatus for demonstrating telecommunications products as recited in claim 1 wherein said telecommunication service equipment includes a circuit simulator, said circuit simulator being coupled to a matrix switch and controlled by said sales agent workstation.

12. An apparatus for demonstrating telecommunications products as recited in claim 11 wherein said circuit simulator is coupled to a matrix switch and controlled by a web server.

\* \* \* \* \*